M. STUCATUR.
AUTOMATIC CHANGE SPEED MECHANISM.
APPLICATION FILED JUNE 10, 1921.

1,416,996.

Patented May 23, 1922.
5 SHEETS—SHEET 3.

INVENTOR
Matthew Stucatur.
BY
ATTORNEYS

M. STUCATUR.
AUTOMATIC CHANGE SPEED MECHANISM.
APPLICATION FILED JUNE 10, 1921.

1,416,996.

Patented May 23, 1922.

Fig. 5.
On Line 5-5 Fig. 1.

Fig. 6.
On Line 6-6 Fig. 1.

INVENTOR
Matthew Stucatur.
BY
Niedersheim Fairbanks
ATTORNEYS

M. STUCATUR.
AUTOMATIC CHANGE SPEED MECHANISM.
APPLICATION FILED JUNE 10, 1921.

1,416,996.

Patented May 23, 1922.
5 SHEETS—SHEET 5.

INVENTOR
Matthew Stucatur.
BY
ATTORNEYS

UNITED STATES PATENT OFFICE.

MATTHEW STUCATUR, OF PHILADELPHIA, PENNSYLVANIA.

AUTOMATIC CHANGE-SPEED MECHANISM.

1,416,996.   Specification of Letters Patent.   Patented May 23, 1922.

Application filed June 10, 1921.   Serial No. 476,369.

*To all whom it may concern:*

Be it known that I, MATTHEW STUCATUR, a citizen of the United States, residing in the city and county of Philadelphia, State of Pennsylvania, have invented a new and useful Automatic Change-Speed Mechanism, of which the following is a specification.

My invention consists of a novel construction of an automatic change speed mechanism, wherein I employ a driving shaft, a driven shaft, clutch mechanism, governor mechanism, connecting mechanism common to the governor mechanism and clutch mechanism, in conjunction with suitable gearing, and a free wheel clutch or braking device, whereby I have produced a device which is automatic in its operation and one wherein any increase of speed of the driven shaft will automatically cause the clutch to engage without attention on the part of the operator, thereby automatically putting the mechanism in its higher speed.

It further consists of a novel construction of clutch mechanism, a runway plate in proximity thereto and having cams fulcrumed therein and coacting with said clutch mechanism and a governor adapted automatically to actuate said cams.

It further consists of a novel construction of plates having shafts mounted therein for pinions of a train of gearing, a clutch mechanism of which one of said plates forms a part, a runway plate secured to said clutch plate, a governor and automatically operated cam mechanism common to said governor and clutch mechanism.

It further consists of a novel construction of a brake drum having an internal gear, pinions in mesh with said gear, a driving shaft having a gear thereon in mesh with said pinions, a clutch mechanism, an automatic governor and cam mechanism common to said governor and clutch mechanism.

It further consists of a novel construction of clutch mechanism, a centrifugal governor, a floating contact ring for said clutch mechanism, a runway plate intermediate said governor and clutch mechanism and cams fulcrumed in said runway plate and actuated by said governor.

It further consists of a novel construction of gearing, clutch mechanism, runway plate, cams therein, governor and spring pressed plungers common to the weights of said governor and to said runway plate.

It further consists of a novel construction of a governor, having weights movably mounted therein, a spring member carried by said weights, a runway plate, cams fulcrumed therein, and actuated by said springs, a clutch mechanism actuated by said cams, pinions carried by said clutch mechanism, and internal and external gears coacting with said pinions.

It further consists of a novel collocation of gearing, clutch, governor and cam mechanisms contained within a suitable casing, wherein a light, compact, durable and effective automatic device of the character hereinafter described is produced, which will be fool-proof, and dust-proof, but at the same time readily accessible for purposes of inspection, replacement or repair.

It further consists of other novel features of advantage and construction, all as will be hereinafter fully set forth.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Similar numerals of reference indicate corresponding parts.

Referring to the drawings:—

1 designates my novel construction of transmission, having the driving shaft 2 therein, said shaft being driven from an engine, motor or other source of power or prime mover and extending through said transmission and having a portion 3 of reduced diameter and carrying the driven shaft 4, loosely mounted thereon.

The clutch drum 5 is fastened to the driving shaft 2 by means of the key 6, and carries the gear 7 which is keyed to the hub 8 of said drum by the key 9, and the said drum 5 also carries the clutch ring or plate or planet carrier 10, which latter is mounted loosely on the hub 8.

11 designates the brake drum on whose inner periphery is formed the internal or orbit gear 12 in mesh with the reduction planet pinions 13.

The planet pinons 13 are loosely mounted on the shafts 14, whose ends are mounted in the clutch plate or planet carrier 10 and in the outer disc or plate 15 respectively and are secured in said plate or planet carrier 15 by the set screws 16, the opposite ends of said shafts having a driving fit with said clutch plate, and said pinions are in constant mesh with the gear 7 and the internal gear 12, thereby forming an epicyclic train of gearing, which I preferably employ, although it will be evident that other equivalent forms of power transmission mechanism might be employed.

17 designates a casing for the clutch and governor mechanisms and their adjuncts, having the end cover plate 18 secured thereto by the screws 19.

The clutch ring 10 is connected to the casing 17 by means of the elongated screws 20, which also pass through the runway plate 21, thereby securing the same to said casing, said screws passing through the lugs 22 of said casing as shown in Figures 1, 3, 4 and 6.

Figures 1, 14:
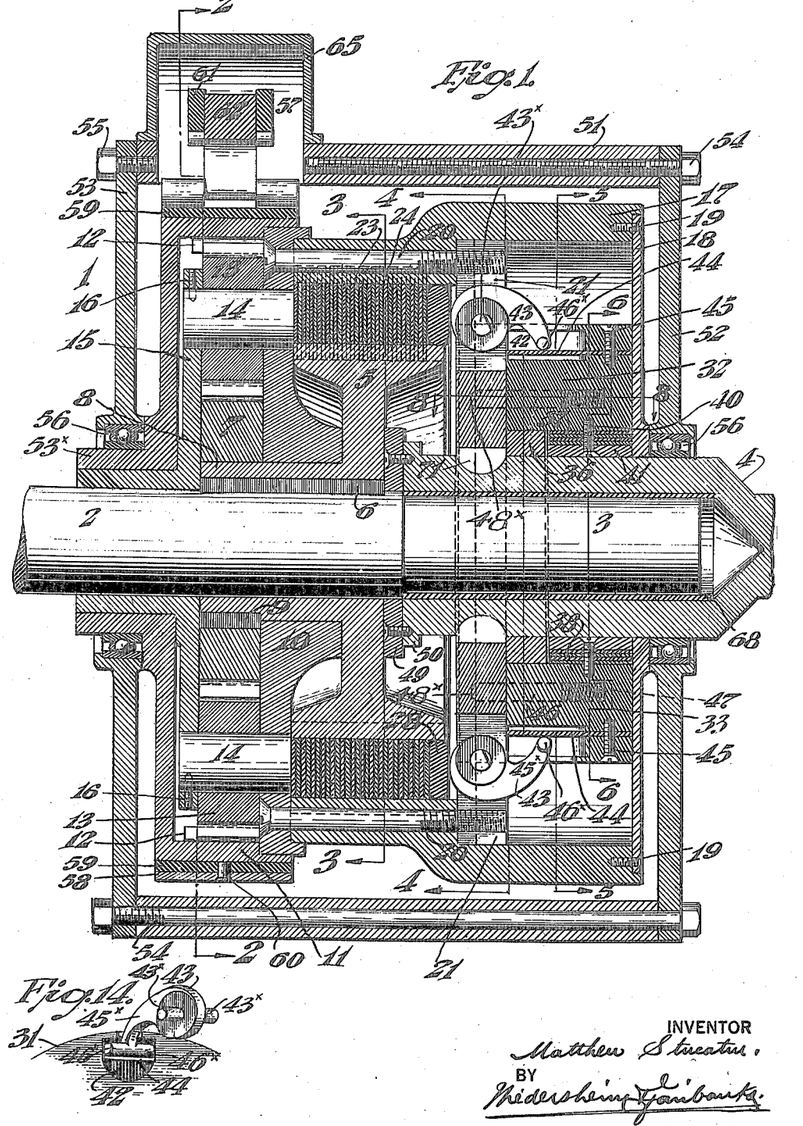
Fig. 1 represents a vertical sectional view of an automatic change speed mechanism embodying my invention, certain of the parts being omitted for the sake of clearness of illustration, and certain parts being shown in elevation.
Fig. 14 represents a perspective view of one of the cams carried by the runway plate, showing the manner of mounting said cam with respect to the runway plate and the governor weights.
Figures 1, 2:
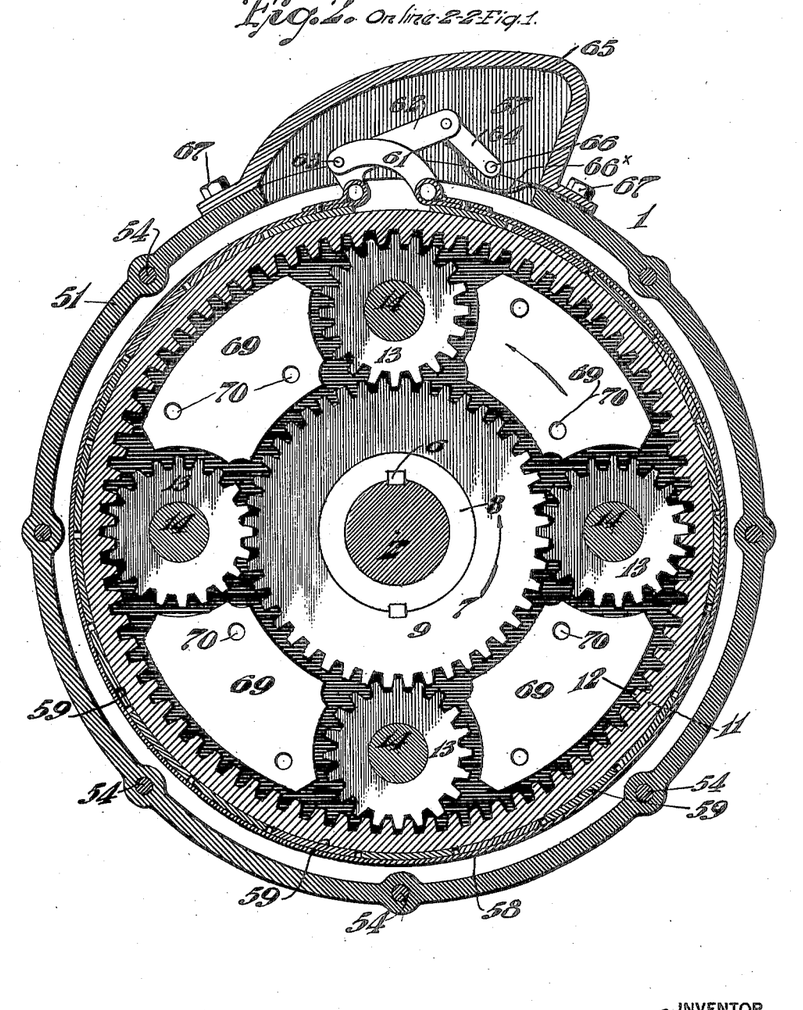
Fig. 2 represents a section on line 2—2 Figure 1, showing the brake drum and its adjuncts and the gearing therein.
Figures 1, 3, 4, 10, 11:
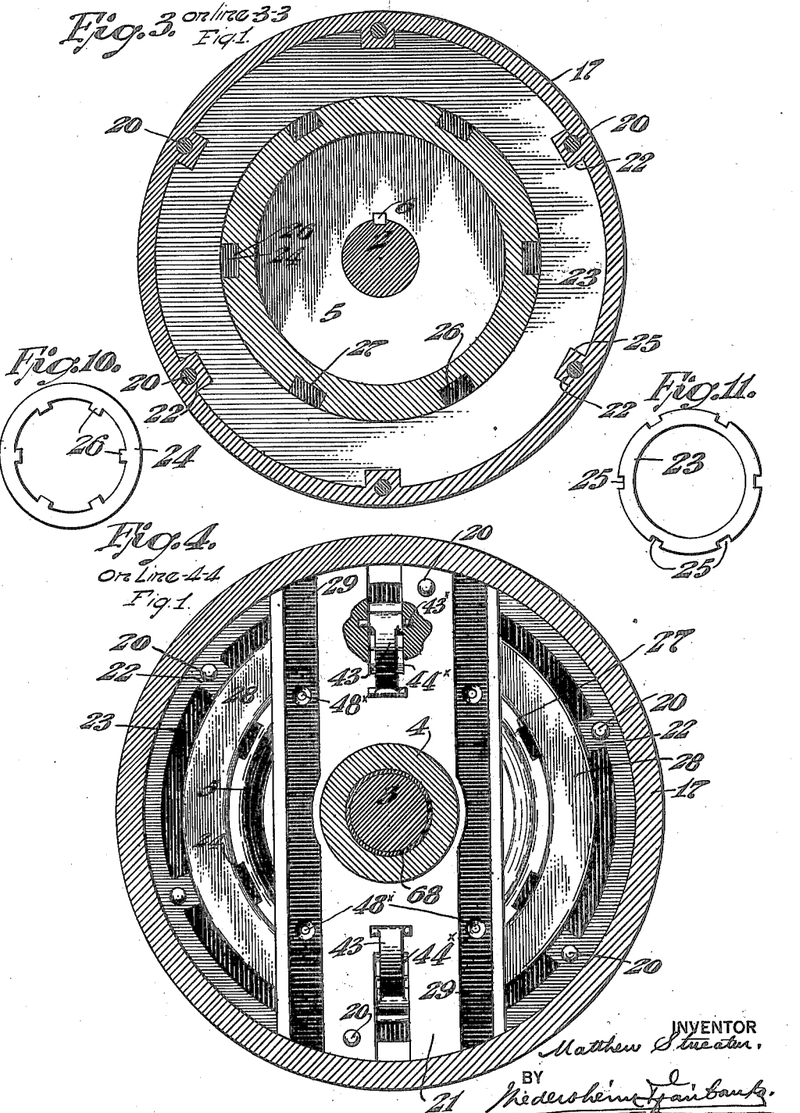
Fig. 3 represents a section on line 3—3 Fig. 1, showing the preferred arrangement of certain elements of the clutch mechanism and their adjuncts.
Fig. 4 represents a section on line 4—4 Fig. 1, showing particularly the driving shaft, the runway plate and the coacting cams therein, and the floating contact ring coacting with the clutch mechanism.
Figs. 10 and 11 represent on a reduced scale, plan views of the detached friction disks seen in assembled position in Figs. 1 and 3.

23 and 24 designate the clutch discs, which may be of any conventional type, but I preferably employ the constructions seen in Figs. 3, 10 and 11, the clutch discs 23 being notched in their outer periphery as at 25 and held in non-rotatable position by the lugs 22, while the clutch discs 24 have the inner lugs 26 and are also held in non-rotatable position by the slots 27 of the clutch drum 5, as will be understood from Figs. 3 and 4.

28 designates a floating contact ring loosely carried in the outer portion of the clutch drum 5, in proximity to the right hand clutch disk 24, best seen in Fig. 10, it being apparent that said contact ring is adapted to touch the contiguous clutch disk 24, but is capable of slippage with respect thereto, according to requirements, as will be understood from Fig. 1.

The slots or grooves 29 of the runway plate 21 receive the tongues or lugs 30 of the governor 31, which is loosely mounted between the runway plate 21 and the outer plate 18, which plates are fast on the driven shaft 4. The governor consists of the weights 32 and 33 which are connected by the links 34 to the diametrically opposite arms 35 of the sleeve member 36 loosely mounted on the driven shaft 4. The measuring springs 37 and 38 are connected at their outer or free ends by the links 39, the bowed portion of said springs being fastened to said weights by the screws 40 which pass through the blocks 41, see Figures 1, 6 and 13.

42 designates slots in the outer portions of the weights 32 and 33 of the governor 31, which are adapted to receive the cams 43 or their equivalents loosely mounted on their shafts $43^x$ which are fast in the walls of the slots $44^x$, of the runway plate 21, said cams having controlling arms $45^x$ having lugs $46^x$, constantly in contact with a straight spring 44, said spring being fastened in said weights by the screws 45, best seen from Fig.

1. It will be seen from Fig. 14 that the lugs 46ˣ are in contact with the top walls of their slots by reason of the tension of their springs 44.

Figures 7, 8, 13:
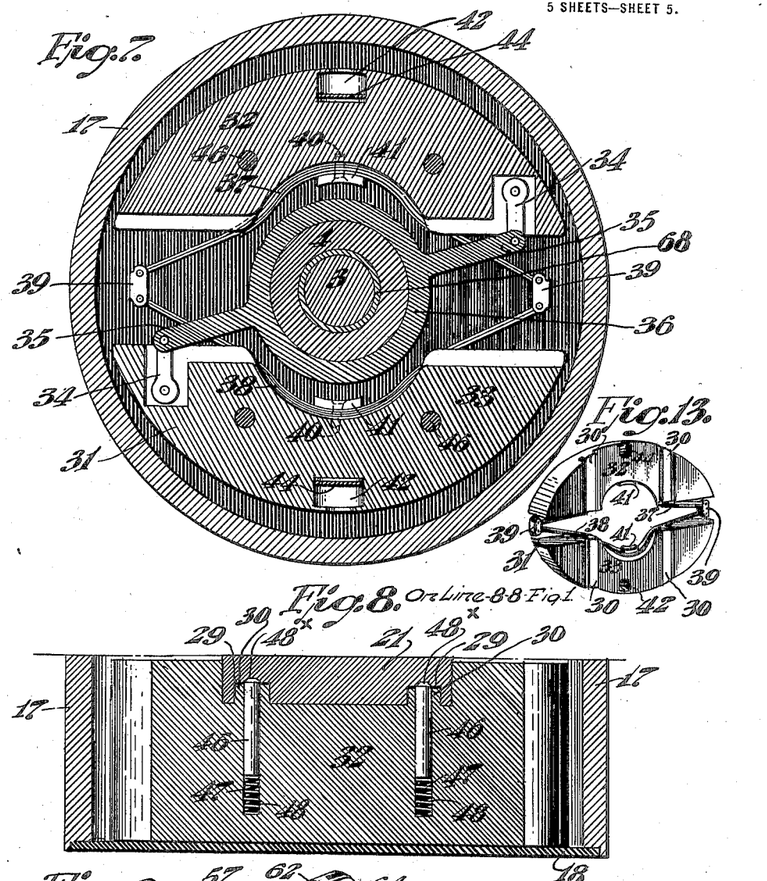
Fig. 7 represents a vertical sectional view similar to Fig. 5, but showing the position of the governor, the measuring springs and their adjuncts at the point of changing into high speed.
Fig. 8 represents a section on line 8—8 Fig. 1, showing the relation of the runway plate with respect to the upper governor weight and showing also the spring-pressed plungers of said weight interlocked with said runway plate, as in low speed position.
Fig. 13 represents a perspective view of the governor showing a plurality of weights, the measuring springs and their adjuncts.

The weights 32 and 33 also carry the plungers 46 and springs 47 which are located in the recesses 48, the pointed ends of said plungers being kept by said springs in contact with the runway plate 21 and located in the seats 48ˣ when the transmission is idle or in low gear, as will be seen from Fig. 8, at which point the plungers retain the weights of the governor in their closed position, until the mechanism or the driven shaft 4 reaches a certain speed, whereupon the centrifugal force at such point will be great enough to cause the ends of said plungers to disengage from their seats 48ˣ in the runway plate and thereby allow the governor weights to move away from each other, by reason of centrifugal action.

49 designates a bearing plate adapted to take up the thrust between the driven shaft 3 and clutch member 5, said plate being secured to the driven shaft by means of the screws 50.

51 designates the transmission housing having the end plate 52 mounted on the driven shaft 4 and the end plate 53 mounted on the hub 53ˣ of the brake drum 11, said end plates 52 and 53 being secured to the housing by means of the studs 54 and 55 respectively.

56 designates ball bearings designed to take up thrust and load.

57 designates a reacting braking device adapted to prevent the reverse motion of the brake drum and its internal gear and to take up any reaction, when the mechanism is in low gear and allow free motion when the same is in high gear, and comprises a brake band 58, having brake shoes 59 fastened thereon by means of the rivets or the like 60, the ends of said brake band being pivotally connected by the link 61 and elbow lever 62 which are pivoted together at 63, said elbow lever having one end of the link 64 pivoted to it, while the other end of said link is pivoted to the cover 65 at the point 66, the spring 66ˣ, having its free end normally pressing upwardly on the bottom of the link 64, whereby the proper frictional contact is insured between the shoes 59 and the contiguous brake drum.

The cover 65 is secured to the housing 51 by means of the cap screws 67.

It will be seen from the foregoing that I enclose within the outer casing 51 and the end plates 52 and 53 the entire operative elements of my novel automatic mechanism, the epicyclic train of gearing composed of the gear 7, pinions 13 and annular internal gear 12 being preferably located at the left-hand portion of the casing, while the automatic governor mechanism 31 is preferably located at the right of the casing, the clutch mechanism, runway plate and their adjuncts, being preferably located between the gearing and the governor mechanism, whereby a very compact and efficient structure is produced.

It will, however, be understood that changes in the collocation of these elements and in the precise character of the gearing employed and also of the clutch mechanism as well as in the governor mechanism may be made by those skilled in the art, without departing from the spirit of my invention, and while I have shown particularly in Figure 1 the preferred general arrangement and collocation of my novel elements, which I have found in practice to operate efficiently, it will be apparent that slight changes in the structural features and the manner of collocating the various devices may be made if desired.

It will be apparent that the driven shaft 4 may be mounted directly upon the reduced portion 3 of the driving shaft, in case said portions 3 and 4 are case hardened, but in practice I preferably employ a bushing 68 composed of bronze or a suitable alloy.

I may also in practice construct the plates 15 and 10 of bronze or a suitable alloy and also the bearing plate 49. The cams 43 seen in Figures 1 and 14 are preferably of hardened steel, as it is essential that these devices be very accurate and exact in their operation.

In Figure 2, I have shown four spacing and reinforcing blocks 69, which are collocated intermediately of the pinions 13 and are slightly thicker than said pinions, said blocks being secured in position by bolts 70, which pass through said blocks, said bolts being fastened into the plates 10 and 15 and serving to properly secure the parts 10, 69 and 15 in assembled position.

I have purposely not shown the blocks 69 in Figure 1 for the sake of clearness of illustration, but it is thought that their location and function will be clearly understood from the foregoing.

The operation is as follows:—

It will be understood from the foregoing, that the casing 51, together with its end plates 52 and 53 is stationary with respect to the driving shaft 2 and the driven shaft 4.

Figures 9, 12:
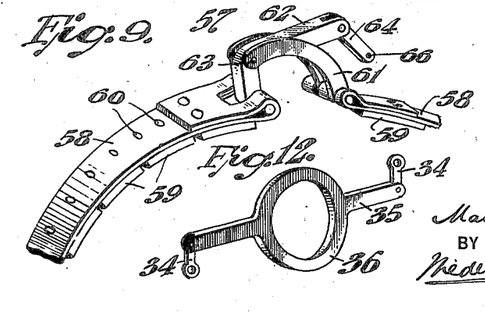
Fig. 9 represents a perspective view of the upper portion of the braking mechanism seen in Figs. 1 and 2.
Fig. 12 represents in detached position a perspective view of a portion of the governor mechanism seen in Figs. 5 and 7.

It will also be understood that the rotation of the driving shaft 2 causes the driving gear 7 to rotate in unison therewith, the rotation of the driving gear 7 effecting the rotation of the planet pinions 13. The internal or orbit gear 12 is kept from rotating backwards by the mechanism seen in the upper portion of Figure 2 and in Figure 9, in conjunction with the brake band 58.

At low speed it will be apparent that the driving shaft 2, the gear 7 and the pinions 13 are rotating in unison and the pinions 13 roll on the internal rack 12 and carry their shafts 14, so that the latter have an independent rotation in a direct ratio with respect to the driving shaft 2. As the shafts 14 travel around the driven shaft 2, they carry with them the plates 15 and 10, the outer case 17, the runway plate 21, the governor mechanism 31 and the driven shaft 4, and also one set of the friction disks intermediate the floating ring 28 and the plate 10.

It will be understood that the runway plate 21 is fast on the driven shaft 4, being secured thereto by the keys 71 best seen in Figure 1, so that said runway plate 21 and the driven shaft 4 rotate as a unit.

Figure 5:
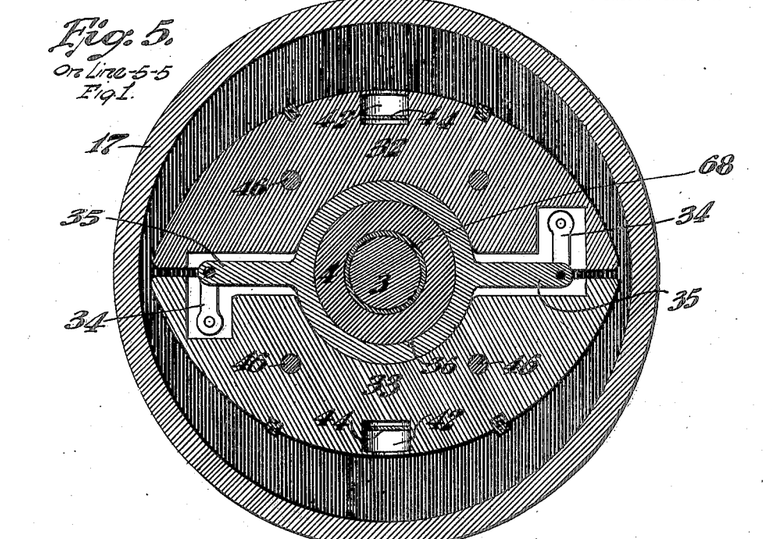
Fig. 5 represents a section on line 5—5 Fig. 1, showing certain portions of the governor and its adjuncts, the governor weights being in their low speed position.

As the speed of the driving shaft 2 and the driven shaft 4 increases, it will be apparent that at a certain point of the increased speed, centrifugal force will cause the weights 32 and 33 to move from the position seen in Figure 5 to the position seen in Figure 7 and at this stage of the operation, the pointed ends of the plungers 46 fly out of their seats 48× in the runway plate 21, seen in Figures 8 and 4, whereupon the weights 32 and 33 assume the position seen in Figure 7.

Figure 6:
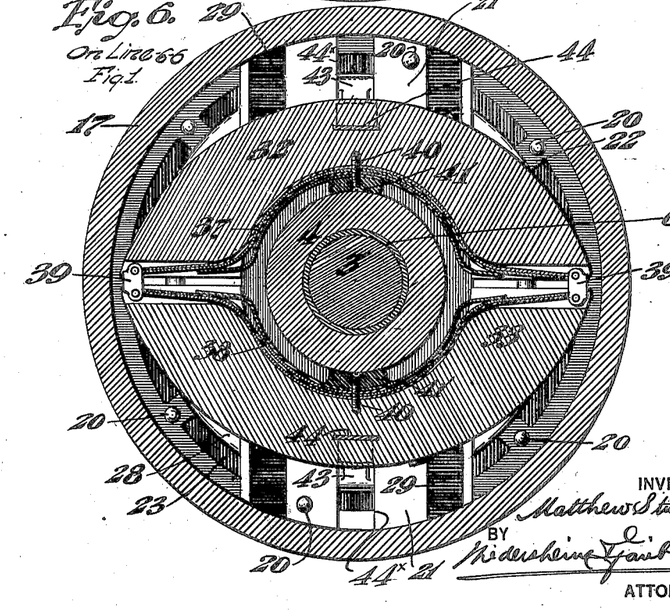
Fig. 6 represents a section on line 6—6 Fig. 1, showing the runway plate, the cams therein, the governor weights, their measuring springs and the relative position of said parts to the driving and driven shafts.

As soon as the speed has increased to such an extent as to cause the weights 32 and 33 to move apart to their maximum extent as far as they can go outwardly or a little further than seen in Figure 7, it will be apparent that the springs 44 also have moved outwardly from the position seen in Figures 1 and 6, thereby moving or rocking the ends 46× of the cams 43, whereby the opposite or operative curved faces of said cams will exert pressure inwardly on the floating ring 28, thereby squeezing the clutch disks 23 and 24 together. The friction disks being now compressed and the driving shaft 2 being fast to the clutch drum 5 and the driven shaft 4 being fast to the runway plate 21 and the casing 17 being fast to the plate 10, it will be apparent that these elements will rotate as a unit, it being understood that one set of the friction disks is fastened to the casing 17 and the other set is fastened to the clutch drum 5, so that these two sets of disks are clamped together through the pressure on the floating ring 28. The driving shaft 2 and the driven shaft 4 now revolving as a unit, carry with them the entire mechanism, including the train of gears seen in Figure 2 and at the left of Figure 1 and a forward rotation of the brake drum 11 is permitted by the automatic release of the ratchet device 57, seen at the top of Figure 2 and in Figure 9 and the machine is now in high speed. Upon the speed of the mechanism falling below a predetermined point, the measuring springs 37 and 38 of the governor overcome the centrifugal force of the weights 32 and 33 to such an extent that they pull said weights together towards their inward position, as will be understood from Figures 5 and 6, carrying with them the cams 43 and removing pressure from the floating ring 28, thus releasing the clutch disks. This condition will tend to cause the internal gear 12 to try to turn backwardly, but the reaction device 57 automatically prevents this motion. Now the machine has returned to low gear, and a further increase of speed will cause the various elements above described to repeat the operations above described and return to high gear condition, all these operations taking place automatically and requiring no attention on the part of the operator.

Although my invention is adapted to various uses it is designed particularly for a gasoline automobile of any conventional type and in practice it may be used in conjunction with a two speed and reverse or a three speed and reverse transmission of any conventional type, forming an auxiliary to the device described.

When my invention is applied to an automobile, it is preferred to arrange the clutch and brake control on two pedals, similar to that at present used in the "Reo" automobile, in which case I leave the control lever in "high" speed position and disconnect the motor by means of the clutch.

To put the car in motion, the driver must partially release the clutch pedal, and to increase his speed he gives the motor more gasoline.

The shift is made automatically.

If the car slows down, due to the operator reducing the amount of fuel supply, or due to the car encountering a steep grade or a muddy or sandy road, the measuring springs 37 and 38 will overcome the centrifugal force of the governor 31 and the mechanism will resume its low speed position or condition, until the above conditions change and the car or its rear wheels once more reaches a speed justifying a change into high.

The two speeds of the automatic unit can be varied by the auxiliary gearing every position of the auxiliary giving two different speeds, the reverse being built in with the auxiliary.

The auxiliary is to be used only for abnormal conditions such as a very steep hill, a muddy or sandy road or unsatisfactory motor conditions.

It will be evident that when other systems of gearing than the epicyclic type such as shown are employed or as shown in Figures 1 and 2, that I can dispense with the brake drum, brake band and the reaction device 57, and may substitute in lieu thereof a free wheel clutch of any conventional type.

It will now be apparent that I have devised a new and useful automatic change speed mechanism, which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:—

1. In a device of the class described, a driving shaft, a driven shaft, a driving gear and clutch element carried by said driving shaft, a planet carrier having a co-operating clutch element carried by said driven shaft, planet pinions on said carrier meshing with said driving gear, an orbit gear with which said planet pinions also mesh and centrifugal means on said driven shaft for effecting the automatic actuation of one of said clutch elements with respect to the other clutch element.

2. In a device of the class described, driving and driven shafts, a driving gear and clutch element carried by the driving shaft, a planet carrier having a cooperating clutch element carried by the driven shaft, planet pinions on said carrier meshing with the driving gear, an orbit gear with which said planet pinions also mesh and centrifugal means on the driven shaft for bringing said clutch elements into locking relation.

3. In a device of the character stated, the combination of a driving shaft, a driven shaft, a clutch having one element mounted on said driving shaft, the other element being mounted on said driven shaft, a governor mounted on said driven shaft, a train of gearing, a portion of which is carried by an element of said clutch for driving the driven shaft from the driving shaft, and connections intermediate said governor and clutch for bringing said clutch elements into clutching relation.

4. In a device of the character stated, a driving shaft, a driven shaft, a clutch having an element mounted on said driving shaft, the other element being mounted on said driven shaft, a train of gearing, a portion of which is carried by an element of said clutch for driving the driven shaft from the driving shaft, a governor mounted on said driven shaft, and comprising weights resiliently supported, a floating ring for said clutch, and cams intermediate of said governor weights and ring for actuating the latter and said clutch.

5. In a device of the character stated, the combination of a driving shaft, a driven shaft, a clutch having an element mounted on said driving shaft, the other clutch element being mounted on said driven shaft, a train of epicyclic gearing having an element connected to the driven shaft element of said clutch, and another element connected to the driving shaft, a governor on said driven shaft comprising weights resiliently supported, a runway plate fast on said driven shaft and intermediate of said clutch and governor, and cams carried by said plate and operated by said weights for actuating one element of said clutch.

6. In a device of the character stated, a brake drum, having an orbit gear thereon, a driving shaft, a gear rotating in unison therewith, planet pinions intermediate said gears, shafts for said pinions, a driven shaft, a clutch mechanism comprising clutch disks and a plate, carried by the driven shaft, said plate carrying the ends of said shafts, co-operating clutch elements carried by the driving shaft, a governor comprising weights resiliently supported, and connections common to said weights and an element of said clutch mechanism for compressing said disks as the speed of said governor increases.

7. In a device of the character stated, a driving shaft, a driven shaft, a driving gear on said driving shaft, an orbit gear, a train of gearing intermediate said gears, a clutch for driving the driven shaft from the driving shaft, having an element carrying a portion of said gearing, a centrifugal governor on said driven shaft comprising weights resiliently supported, a runway plate fast on said driven shaft, and interposed between said clutch and governor, interlocking devices common to said weights and plate, and devices intermediate said governor and clutch for bringing the clutch elements into locking relation.

8. In a device of the character stated, a driving shaft, a driving gear thereon, an orbit gear, a driven shaft, a train of gearing intermediate said gears, a clutch for driving the driven shaft from the driving shaft, having one element carrying a portion of said gearing, a centrifugal governor on said driven shaft comprising weights resiliently supported, a runway plate fast on said driven shaft and interposed between said clutch and governor, interlocking devices common to said weights and plate, laterally extending springs on said governor weights and cams having one end in contact with said lateral springs, the opposite portions of said cams being adapted to acuate an element of said clutch.

9. In a device of the character stated, a driving shaft, a driven shaft, a clutch for driving the driven shaft from the driving shaft, having one element mounted on said driving shaft, the other element being mounted on said driven shaft, a gear rotatable in unison with said driving shaft, a plurality of planet pinions in mesh with said gear, an orbit gear in mesh with said planet pinions, said pinions being rotatable in unison with one of said clutch elements, a floating ring for said clutch, a runway plate fast on said driven shaft, a governor mounted on said driven shaft and comprising weights resiliently supported, laterally extending springs carried by said governor, and cams movably mounted in said runway plate and having an extension in contact with said lateral springs, a portion of said cams contacting with said floating ring for bringing the clutch elements into locking relation.

10. In a device of the character stated, a driving shaft, a driven shaft, a clutch for driving the driven shaft from the driving shaft, having one element mounted on said driving shaft, the other element being mounted on said driven shaft, a gear rotatable in unison with said driving shaft, a plurality of planet pinions in mesh with said gear, an orbit gear in mesh with said planet pinions, said pinions being rotatable in unison with an element of said clutch, a floating ring for said clutch, a runway plate fast on said driven shaft, a governor mounted on said driven shaft and comprising weights resiliently supported, laterally extending springs carried by said governor, cams movably mounted in said runway plate and having an extension in contact with said lateral springs, the opposite portions of said cams contacting with said floating ring for bringing the clutch elements into locking relation, and interlocking devices common to said weights and runway plate.

11. In a device of the character stated, a driving shaft, a driven shaft, a clutch for driving the driven shaft from the driving shaft, having one element mounted on said driving shaft, a driving gear rotatable in unison with said driving shaft, a plurality of planet pinions in mesh with said gear, an orbit gear in mesh with said pinions, a clutch having an element mounted on said driving shaft, said planet pinions being rotatable in unison with said clutch element, a floating ring, a runway plate fast on said driven shaft, a governor mounted on said driven shaft and comprising weights resiliently supported, laterally extending springs carried by said governor weights, cams movably mounted in said runway plate and having an extension in contact with said lateral springs, the opposite portions of said cams contacting with said floating ring for bringing the clutch elements into locking relation, interlocking devices common to said weights and runway plate, the outer surface of said orbit gear forming a brake drum, a brake band enclosing said brake drum and reaction devices for said brake band.

12. In a device of the character stated, a driving shaft, a driven shaft mounted thereon, a clutch for driving the driven shaft from the driving shaft, having one element mounted on said driving shaft, its other element being mounted on said driven shaft, a train of gearing, a portion of which is carried by an element of said clutch mechanism, a runway plate fast on said driven shaft, a governor mounted on said driven shaft and comprising weights resiliently supported and cams fulcrumed in said runway plate and having extensions actuated by said governor weights, the portions of said cams opposite to said extensions being adapted to actuate an element of said clutch.

13. In a device of the character stated, a driving shaft, a driven shaft mounted thereon, a clutch mechanism having one element mounted on said driving shaft, its other element being mounted on said driven shaft, a train of gearing, a portion of which is carried by an element of said clutch mechanism for driving the driven shaft from the driving shaft, a runway plate fast on said driven shaft, a governor mounted on said driven shaft and comprising weights resiliently supported, cams fulcrumed on said runway plate and having extensions actuated by said governor weights, the portions of said cams opposite to said extensions being adapted to actuate an element of said clutch, and interlocking devices common to said governor weights and said runway plate.

14. In a device of the character stated, a driving shaft, a driven shaft mounted thereon, a clutch mechanism having one element mounted on said driving shaft, its other element being mounted on said driven shaft, a train of gearing, a portion of which is carried by an element of said clutch mechanism for driving the driven shaft from the driving shaft, a runway plate fast on said driven shaft, a governor mounted on said driven shaft and comprising weights resiliently supported, cams fulcrumed on said runway plate and having extensions actuated by said governor weights, the portions of said cams opposite said extensions being adapted to actuate an element of said clutch, and interlocking devices common to said governor weights and runway plate, said runway plate having grooves thereon and tongues on the contiguous surfaces of said weights adapted to ride in said grooves.

15. In a device of the character stated, a driving shaft, a driven shaft, a clutch having one element mounted on said driving shaft and its other element mounted on said driven shaft, a train of gearing, a portion of which is carried by an element of said clutch, a runway plate fast on said driven shaft, and having grooves thereon, a governor mounted on said driven shaft and composed of weights resiliently supported, said weights being provided with tongues engaging the grooves in said runway plate, and means actuated by said weights for bringing said clutch elements into locking relation.

16. In a device of the character stated, a driving shaft, a driven shaft, a clutch having one element mounted on said driving shaft and the other element on said driven shaft, a train of gearing, a portion of which is carried by an element of said clutch, a runway plate fast on said driven shaft, a governor on said driven shaft composed of weights resiliently supported, said weights being provided with parallel tongues aligning with and engaging the grooves in said runway plate, and spring actuated interlocking devices common to said weights and said runway plate, said governor being adapted to bring said clutch elements into locking relation.

17. In a device of the character stated, a driving shaft, a driven shaft, a clutch for driving the driven shaft from the driving shaft, having one element mounted on said driving shaft, its other element being mounted on said driven shaft, a train of gearing having a portion thereof carried by an element of said clutch, a floating ring for said clutch, cams contacting with said floating ring, a runway plate secured to a portion of said clutch and fast upon said driven shaft, said runway plate having grooves therein, a centrifugal governor comprising weights resiliently supported, and tongues on said weights engaging the grooves of said runway plate, said cams being actuated by said governor weights for automatically exerting pressure on said floating ring, as the speed of said governor increases.

18. In a device of the character stated, a driving shaft, a driven shaft, a clutch for driving the driven shaft from the driving shaft, having one element mounted on said driven shaft, and its other element mounted on said driving shaft, a train of gearing having a portion thereof carried by an element of said clutch, a floating ring for said clutch, cams contacting with said floating ring, a runway plate carrying said cams and secured to an element of said clutch and fast upon said driven shaft, said runway plate having grooves therein, a centrifugal governor on said driven shaft comprising weights resiliently supported, tongues on said weights engaging the grooves of said runway plate, said cams being actuated by said governor for automatically exerting pressure on said floating ring, and interlocking spring pressed devices common to said runway plate and governor weights.

19. In a device of the character stated, a driving shaft, a driven shaft, a clutch for driving the driven shaft from the driving shaft, having one element mounted on said driving shaft and its other element on said driven shaft, a train of gearing, having a portion thereof carried by said clutch, a runway plate fast on said driven shaft, a floating ring carried by an element of said clutch, a governor on said driven shaft comprising weights resiliently supported, cams intermediate said weights and floating ring for actuating the latter, and resilient means carried by said governor weights for actuating said cams.

20. In a device of the character stated, a driving shaft, a driven shaft, a clutch for driving the driven shaft from the driving shaft, having one element mounted on said driving shaft, and its other element on said driven shaft, a train of gearing having a portion thereof carried by an element of said clutch, a runway plate fast on said driven shaft, a floating ring carried by an element of said clutch, a governor on said driven shaft, comprising weights resiliently supported, cams intermediate of said weights and floating ring and adapted to be actuated by said weights, resilient means carried by said governor weights for actuating said cams, and spring pressed interlocking devices common to said governor weights and runway plate.

21. In a device of the character stated, a driving shaft, a driven shaft mounted thereon, a clutch for driving the driven shaft from the driving shaft, having one element mounted on said driving shaft and its other element mounted on said driven shaft, and comprising a clutch drum, an outer casing, clutch disks intermediate said drum and casing, a clutch plate and a floating ring, a train of gearing, a portion of which is carried by said clutch plate, a runway plate secured to said clutch mechanism and fast on said driven shaft, a governor mounted on said driven shaft and comprising weights resiliently supported, lateral spring carried by said governor weights, and cams fulcrumed in said runway plate and having an extension contacting with the lateral springs of said governor weights, the opposite portions of said cams contacting with said floating ring, whereby the latter and the clutch disks are compressed as the speed of the governor increases.

22. In a device of the character stated, a driving shaft, a driven shaft mounted thereon, a clutch for driving the driven shaft from the driving shaft, having one element mounted on said driving shaft, and its other element mounted on said driven shaft and comprising a clutch drum, an outer casing, clutch disks intermediate said drum and casing, a clutch plate and a floating ring, a train of gearing, a portion of which is carried by said clutch plate, a runway plate secured to said clutch mechanism and fast on said driven shaft, a governor mounted on said driven shaft and comprising weights resiliently supported, lateral springs carried by said governor weights, and cams fulcrumed on said runway plate and having an extension contacting with the lateral springs of said governor weights, the opposite portions of said cams contacting with said floating ring, whereby the latter and the clutch disks are compressed as the speed of the governor increases, said governor weights being located on opposite sides of said driven shaft, and pivotally secured with respect to said driven shaft, the springs for said governor weights being also located on opposite sides of said driven shaft, and the opposite ends of said springs being connected together.

23. In a device of the character stated, a driving shaft, a driven shaft, a governor mounted on said driven shaft and comprising a pair of weights resiliently supported, a sleeve member carried by said driven shaft and connected to said weights, whereby the latter move inwardly and outwardly in unison, said weights having slots in their upper portions, lateral springs mounted in said slots, a runway plate fast on said driven shaft and having slots therein, cams fulcrumed in the slots of said runway plate and having an extension contacting with the lateral springs of said governor weights, a clutch for driving the driven shaft from the driving shaft, having one element mounted on said driving shaft, and its other element on said driven shaft, and a floating ring for said clutch adapted to be actuated by the movements of said cams, and governor weights.

24. In a device of the character stated, a driving shaft, a driven shaft, a governor mounted on said driven shaft and comprising a pair of weights resiliently supported, connecting mechanism carried by said driven shaft and common to said weights, whereby the latter move inwardly and outwardly in unison, slots in the upper portion of said weights, a lateral spring mounted in said slots, a runway plate fast on said driven shaft and having slots therein, cams fulcrumed in the slots of said runway plate and having an extension contacting with the lateral springs of said governor weights, a clutch for driving the driven shaft from the driving shaft, having one element mounted on said driving shaft and its other element mounted on said driven shaft, a floating ring for said clutch adapted to be actuated by the movements of said cams and a train of gearing, a portion of said gearing comprising a driving gear mounted on said driving shaft, an orbit gear exterior to said driving gear, and planet pinions common to said orbit gear and driving gear being carried by an element of said clutch.

25. In a device of the character stated, a driving shaft, a clutch plate carried thereby, a driving gear rotatable in unison with said driving shaft, an end plate mounted on said driving shaft, pinion shafts having their ends fast in said plate, planet pinions mounted on said shafts, an orbit gear having its teeth engaged by said planet pinions, a driven shaft, a runway plate fast on said driven shaft, clutching devices intermediate said clutch plate and runway plate, a governor also mounted on said driven shaft and comprising weights resiliently supported, and cams carried by said runway plate and operated by the movement of said weights for effecting the automatic operation of said clutching devices.

26. In a device of the character stated, a driving shaft, a clutch plate carried thereby, a driving gear rotatable in unison with said driving shaft, an end plate mounted on said driving shaft, pinion shafts having their ends fast in said plates, planet pinions mounted on said shafts, an orbit gear having its teeth engaged by said planet pinions, a driven shaft, a runway plate fast on said driven shaft, clutching devices intermediate said clutch plate and runway plate, a governor also mounted on said driven shaft and comprising weights resiliently supported, cams carried by said runway plate and operated by the movement of said weights for actuating said clutching devices, a brake drum formed exteriorly of said internal gear and braking devices for said brake drum.

27. In a device of the character stated, a driving shaft, a clutch plate carried thereby, a gear rotatable in unison with said driving shaft, an end plate mounted on said driving shaft, pinion shafts having their ends fast in said plates, planet pinions mounted on said shafts, an orbit gear having its teeth engaged by said pinions, a driven shaft, a runway plate fast on said driven shaft, clutching devices intermediate said clutch plate and runway plate, a governor also mounted on said driven shaft and comprising weights resiliently supported, cams carried by said runway plate and operated by said weights for actuating said clutching devices, the outer portion of said orbit gear forming a brake drum, a brake band for said brake drum, and reacting devices for said brake band.

28. In a device of the character stated, a driving shaft, a clutch plate carried thereby, a gear rotatable in unison with said driving shaft, an end plate mounted on said driving shaft, pinion shafts having their ends fast in said plates, planet pinions in mesh with said gear and mounted on said shafts, an orbit gear having its teeth engaged by said planet pinions, a driven shaft, a runway plate fast on said driven shaft, clutching devices intermediate said clutch plate and runway plate, a governor also mounted on said driven shaft and comprising weights resiliently supported, cams carried by said runway plate and operated by said weights for actuating said clutching devices, the outer portion of said orbit gear forming a brake drum, braking devices for said brake drum, comprising a brake band, links common to the juxtaposed ends of said brake band and pivotally connected, a clutch casing, a link having one end pivoted to said clutch casing and its other end to one of the links of said brake band, and a spring bearing on the under side of said link pivoted to said casing.

29. In a device of the character stated, a brake drum, a brake band therefor, external links 61 and 62 pivotally connected to each other and each pivotally connected to one of the juxtaposed ends of said brake band, a hinged connection for said external links, a casing for said brake drum, a link 64 also external to said brake drum and having one end pivotally connected to said link 62, a spring carried by said casing and having its free end bearing on the under side of said link 64, a driving shaft, a train of epicyclic gearing common to said brake drum and driving shaft, a clutch for driving the driven shaft from the driving shaft, having one element carried by said driving shaft, a driven shaft, the other element being mounted on said driven shaft, a governor mounted on said driven shaft, and connections intermediate of said governor and clutch for actuating the elements of the latter as the speed of the governor varies.

30. In a device of the character stated, a brake drum, a brake band therefor, external links 61 and 62 pivotally connected to each other and each pivotally connected to one of the juxtaposed ends of said brake band, a hinged connection for said external links, a casing for said brake drum, a link 64 also external to said brake drum and having one end pivoted to a fixed point and its other end pivotally connected to said link 62, a spring having its free end bearing on the under side of said link 64, a driving shaft, a train of epicyclic gearing common to said brake drum and driving shaft, a driven shaft, a governor mounted on said driven shaft, a clutch having one element mounted in said driving shaft and its other elements mounted on said driven shaft, connections intermediate said governor and a clutch element for actuating the latter as the speed of the governor varies and a runway plate fast on said driven shaft and carrying connections intermediate said governor and clutch.

31. In a device of the character stated, a casing, a brake drum having an orbit gear formed on its inner periphery, a brake band for the outer portion of said drum, external links 61 and 62 pivotally connected to each other and each pivotally connected to one of the juxtaposed ends of said brake band, a link 64 also external to said brake drum and having one end pivoted to a fixed point, and its opposite end to said link 62, a spring having its free end in contact with the under side of the link 64, a driving shaft, a driving gear mounted thereon, planet pinions intermediate said driving gear and orbit gear, a clutch having one element carried by said driving shaft, said planet pinions rotating in unison with said clutch element, a driven shaft, another clutch element mounted on said driven shaft, a governor carried by said driven shaft, and comprising weights resiliently supported, a runway plate fast on said driven shaft and located intermediately of said clutch and governor, and cams fulcrumed in said runway plate and adapted to be actuated by said governor and to actuate one of said clutch members, as the speed of said governor varies.

32. In a device of the class described, a driving shaft, a driven shaft in alignment therewith, and provided with an internal bearing for the end of said driving shaft, a driving gear and clutch element carried by said driving shaft, a planet carrier having a cooperating clutch element carried by said driven shaft, planet pinions on said carrier meshing with said driving gear, an orbit gear with which said planet pinions also mesh, means for holding said orbit gear against rotation in one direction and centrifugal means on said driven shaft for effecting the automatic actuation of one of said clutch elements with respect to the other clutch element.

MATTHEW STUCATUR.

Witnesses:
E. HAYWARD FAIRBANKS,
AARON H. HIRSCH.